(12) United States Patent
Yeh et al.

(10) Patent No.: US 8,378,291 B2
(45) Date of Patent: Feb. 19, 2013

(54) METAL VOLUME SOURCE CALIBRATION PHANTOM AND CALIBRATING METHOD THEREOF

(75) Inventors: Chin-Hsien Yeh, Hsinchu (TW); Ming-Chen Yuan, Taoyuan County (TW)

(73) Assignee: Institute of Nuclear Energy Research Atomic Energy Council, Executive Yuan, Taoyuan County (TW)

(*) Notice: Subject to any disclaimer, the term of this patent is extended or adjusted under 35 U.S.C. 154(b) by 302 days.

(21) Appl. No.: 12/883,768

(22) Filed: Sep. 16, 2010

(65) Prior Publication Data

US 2011/0315865 A1    Dec. 29, 2011

(30) Foreign Application Priority Data

Jun. 25, 2010  (TW) ............................... 99120752 A (51) Int. Cl.
*G12B 13/00* (2006.01)
*G01D 18/00* (2006.01)

(52) U.S. Cl. .................................................. 250/252.1
(58) Field of Classification Search ............ 250/251
See application file for complete search history.

(56) References Cited

U.S. PATENT DOCUMENTS

| | | | |
|---|---|---|---|
| 7,385,184 B2 * | 6/2008 | Yeh et al. | 250/252.1 |
| 7,479,628 B1 * | 1/2009 | Yeh et al. | 250/252.1 |
| 2003/0209662 A1 * | 11/2003 | Nelson et al. | 250/252.1 |
| 2004/0021083 A1 * | 2/2004 | Nelson et al. | 250/370.09 |
| 2006/0193421 A1 * | 8/2006 | Orr | 376/156 |
| 2007/0295898 A1 * | 12/2007 | Proctor | 250/252.1 |
| 2008/0087807 A1 * | 4/2008 | Yeh et al. | 250/252.1 |
| 2009/0078875 A1 * | 3/2009 | Rousso et al. | 250/363.04 |
| 2009/0127449 A1 * | 5/2009 | Iwatschenko-Borho | 250/252.1 |
| 2011/0295537 A1 * | 12/2011 | Akers et al. | 702/85 |
| 2011/0315865 A1 * | 12/2011 | Yeh et al. | 250/252.1 |

OTHER PUBLICATIONS

Man-Sung Yim and K. Linga Murty, Material Issues in Nuclear Waste Management, Sep. 2000, Journal of Metals, appears in the journal JOM, 52(9)(2000), pp. 26-29.*

* cited by examiner

*Primary Examiner* — David Porta
*Assistant Examiner* — Taeho Jo
(74) *Attorney, Agent, or Firm* — Morris Manning & Martin LLP; Tim Tingkang Xia, Esq.

(57) ABSTRACT

A metal volume source calibration phantom includes a container, a plurality kinds of metal plates stacked up inside the container, and at least one slab of radioactive source, each of which is disposed between the adjacent metal plates and includes a plurality of radionuclides. By means of inserting different numbers of the plurality kinds of metal plates inside the container, it is capable of obtaining the metal volume source calibration phantoms with different densities. In addition, a method for calibrating the metal volume source calibration phantom is also provided, which starts by the step of providing the metal calibration phantoms with different densities by inserting different numbers of a plurality kinds of metal plates and at least one slab of radioactive source into the container, and then detecting counting efficiency with respect to the metal volume calibration phantoms having different densities by a waste curie monitor so as to establish the correlation between density and counting efficiency.

8 Claims, 10 Drawing Sheets

METAL VOLUME SOURCE CALIBRATION PHANTOM AND CALIBRATING METHOD THEREOF

CROSS-REFERENCE TO RELATED APPLICATIONS

This non-provisional application claims priority under 35 U.S.C. §119(a) on Patent Application No(s). 099120752 filed in Taiwan, R.O.C. on Jun. 25, 2010, the entire contents of which are hereby incorporated by reference.

BACKGROUND OF THE INVENTION

1. Field of Invention

The present invention relates to a source calibration technology, and more particularly to a metal volume source calibration phantom and a calibrating method thereof, which can directly use metal volume source calibration phantoms with different densities to derive the calibration curve for density and counting efficiency, such that according to the counting efficiency from the multi-density source calibration phantom corresponding to the density of the sample of nuclear wastes to be tested, accurate measurement results can be obtained when measuring the counting efficiency for samples of different nuclear waste materials.

2. Related Art

Currently, waste curie monitors, being substantially an assembly of several large-area plastic scintillation detectors, are frequently used for measuring the gross gamma radioactivity of very low radioactive wastes. The monitors are advantageous in its high radioactive sensitivity, high counting efficiency, short counting interval required for counting a sample, no restriction to the volume of the waste to be monitored thereby, and capability of revealing the weight of the waste monitored thereby, and so on.

However, the current waste curie monitors and the calibrating method thereof still have the following shortcomings: (1) a nonmetal calibration phantom is used for measuring the counting efficiency; however, since noncombustible metal wastes upon deregulation are mostly measured in practice, a large error exists between a nonmetal phantom and a metal waste in terms of mass attenuation coefficient and self-shielding effect, and the result of the counting efficiency measurement deviates from the actual value; (2) usually, a single substance is used in the monitor to establish density efficiency, and the fact that the sample is not made up of a single substance is neglected; (3) in the current calibration phantom, metal or nonmetal materials are arranged in a gapless manner, which is different from the loose arrangement of metal wastes, leading to a large error in the result of the counting efficiency measurement; and (4) when calibration phantoms made of different nonmetal materials and with different densities are used to derive the calibration curve, since the phantoms with different densities need to be fabricated using different materials respectively, a long period of time is required for fabricating the phantoms, and certain space is required for storing the finished phantoms, which considerably consumes time and storage space.

Therefore, it is necessary to provide a metal volume source calibration phantom and a calibrating method thereof to solve the problems encountered in the prior art.

SUMMARY OF THE INVENTION

Accordingly, the present invention is directed to a metal volume source calibration phantom, which uses a plurality kinds of metals to form metal volume source calibration phantoms with different densities for measuring the counting efficiency for samples of different nuclear waste materials.

In an embodiment, the present invention provides a metal volume source calibration phantom, disposed inside a monitor having a plurality of radioactivity detectors received inside an accommodation space formed inside the monitor. The metal volume source calibration phantom comprises: a container; a plurality kinds of metal plates stacked up inside the container; and at least one slab of radioactive source, each disposed between the adjacent metal plates and comprising a plurality of radionuclides. By means of inserting different numbers of the plurality kinds of metal plates inside the container, it is capable of obtaining the metal volume source calibration phantoms with different densities.

In another embodiment, the present invention provides a method for calibrating a metal volume source calibration phantom, comprising the following steps: providing a container; inserting different numbers of a plurality kinds of metal plates into the container; disposing at least one slab of radioactive source, each comprising a plurality of first radionuclides, between the adjacent metal plates so as to provide the metal volume source calibration phantoms with different densities; performing a counting efficiency test for the metal volume source calibration phantoms with different densities so as to establish a correlation between a first density of the first radionuclide and the counting efficiency; and replacing the first radionuclide with a second radionuclide, and then performing a counting efficiency test for the metal volume source calibration phantoms with different densities so as to establish a correlation between a second density of the second radionuclide and the counting efficiency.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the features, objectives, and functions of the present invention more comprehensible to the Examiner, the related detailed structures and design ideas and reasons of the system of the present invention are illustrated below, so that the Examiner can better understand the characteristics of the present invention. The detailed illustration is as follows.

Figure 1:
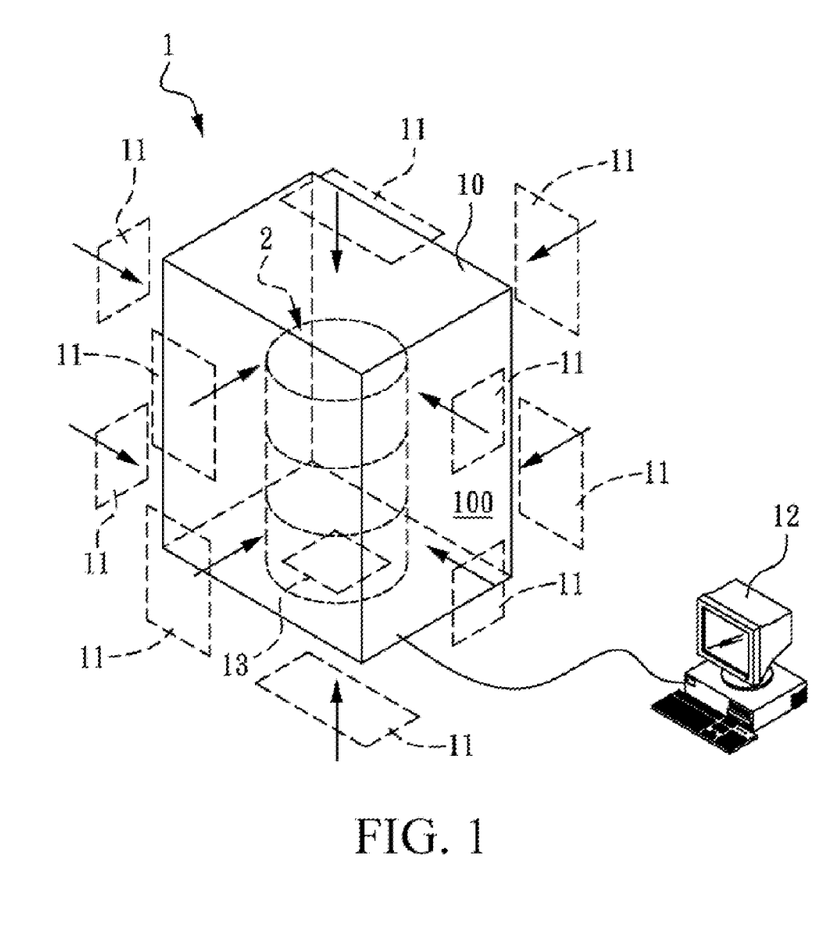
FIG. 1 is a schematic view of a waste curie monitor and a drum-type metal volume source calibration phantom.

FIG. 1 is a schematic view of a waste curie monitor and a metal volume source calibration phantom. Referring to FIG. 1, the waste curie monitor 1 has a shielding 10, which is a hexahedron assembly made of lead of the same thickness. An inspection space 100 is formed in the shielding 10. Ten units of the same large-area radioactivity detectors 11 are arranged on wall surfaces inside the inspection space 100. In this embodiment, the radioactivity detector 11 is a plastic scintillation detector. A weight meter is disposed in the inspection space 100 for weighting an object-to-be-tested. The waste curie monitor further has a microcomputer processor 12 that uses built-in calculation programs and calibration parameters for reading counting efficiency of a sample as well as printing and displaying analytical results.

Figure 2A:
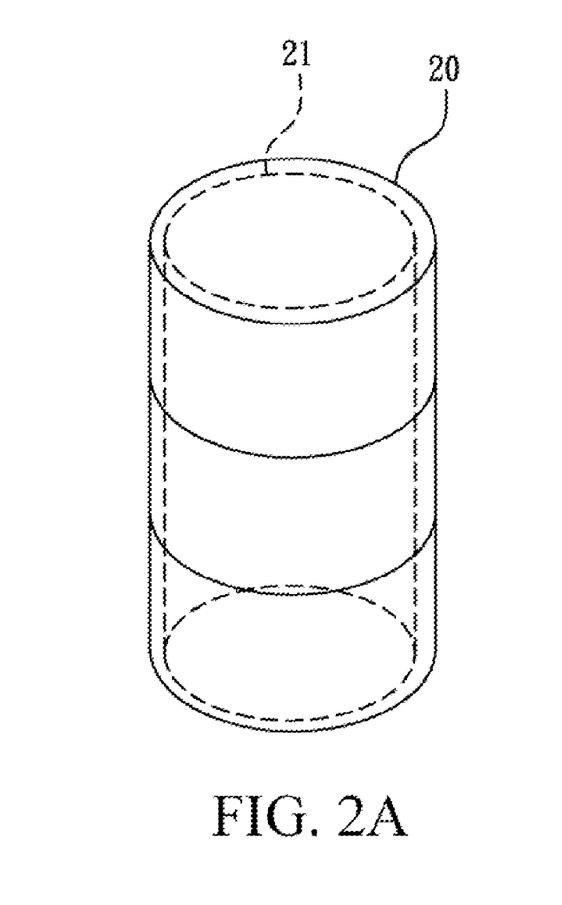
FIG. 2A is a schematic three-dimensional view of a drum-type container.
Figure 3A:
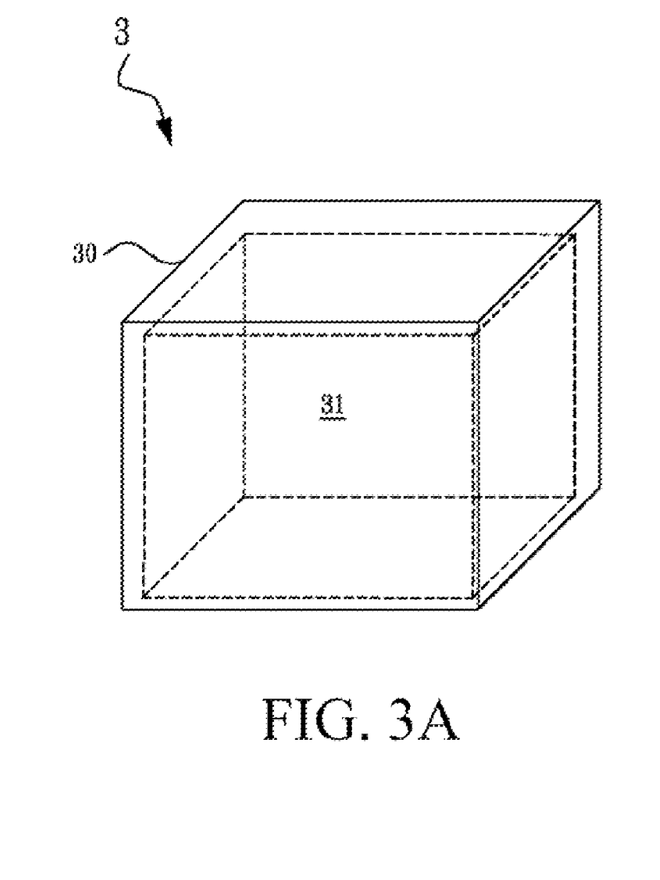
FIG. 3A is a schematic three-dimensional view of a rect-angular-parallelepiped container.

A metal volume source calibration phantom 2 is received in the inspection space 100. Referring to FIG. 2A, the shape of a container of the metal volume source calibration phantom 2 is a drum-type container 20, and the drum-type container 20 has an inner space 21 therein. The drum-type container may be a 55-gallon drum-type container. In addition to the drum-type container, the metal volume source calibration phantom may also be a rectangular-parallelepiped metal volume source calibration phantom 3 as shown in FIG. 3A, the shape of the container is a rectangular-parallelepiped container 30, and the rectangular-parallelepiped container 30 has an inner space 31 therein. It should be noted that the shape of the container of the metal volume source calibration phantom may be changed according to requirements of different countries or the shape of the storage tank of metal wastes, and is not limited to the above shapes.

Figure 2B:
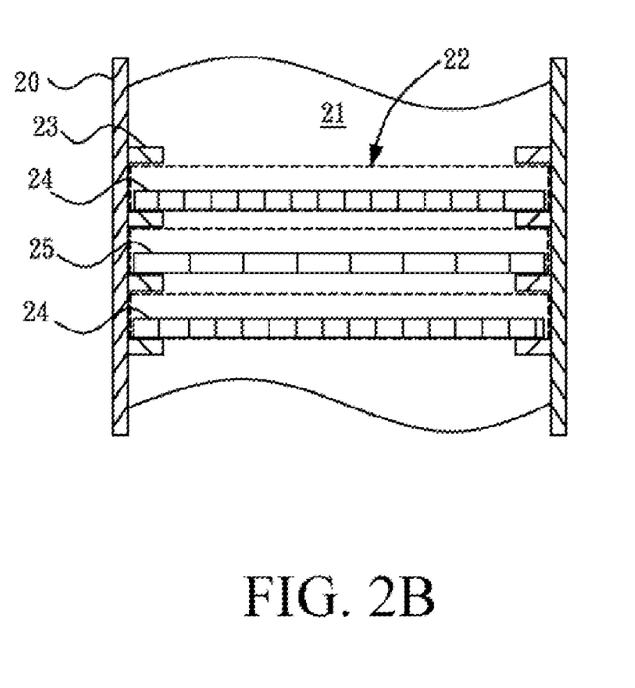
FIG. 2B is a schematic partial view of plates and a slab of radioactive source inserted in the drum-type container.

In this embodiment, the 55-gallon drum-type container is used as an example for illustration. FIG. 2B is a schematic partial view of plates and a slab of radioactive source inserted in the drum-type container. Referring to FIG. 2B, the inner space 21 has a plurality of supporting slots 22 of 2 mm high therein, and supporting portions 23 are formed between the supporting slots to support insertion of the metal plates 24 and the slab of radioactive source 25, such that at least one gap exists between the metal plates 24 inside the container, thereby forming a non-uniform calibration phantom. The metal plate 24 may be made of stainless steel or aluminum, but is not limited thereto. In this embodiment, the drum-type container 20 is a 55-gallon drum, and accordingly, the stainless steel and aluminum are cut into circular pieces of large-area uniform planar metal plates 24 having a diameter of 54 cm and a thickness of 1 mm, and then the metal plates 24 are inserted into the supporting slots 22 of the 55-gallon drum-type container 20 having a diameter of 56 cm and a height of 86 cm. By means of inserting different numbers or kinds of the metal plates 24 by the above method, calibration phantoms with different densities are formed by stainless steel plates, aluminum plates, and stainless steel plates plus aluminum plates. The density of the drum-type metal volume source calibration phantom ranges from 0.11 $g/cm^3$ to 1.80 $g/cm^3$.

Figure 3B:
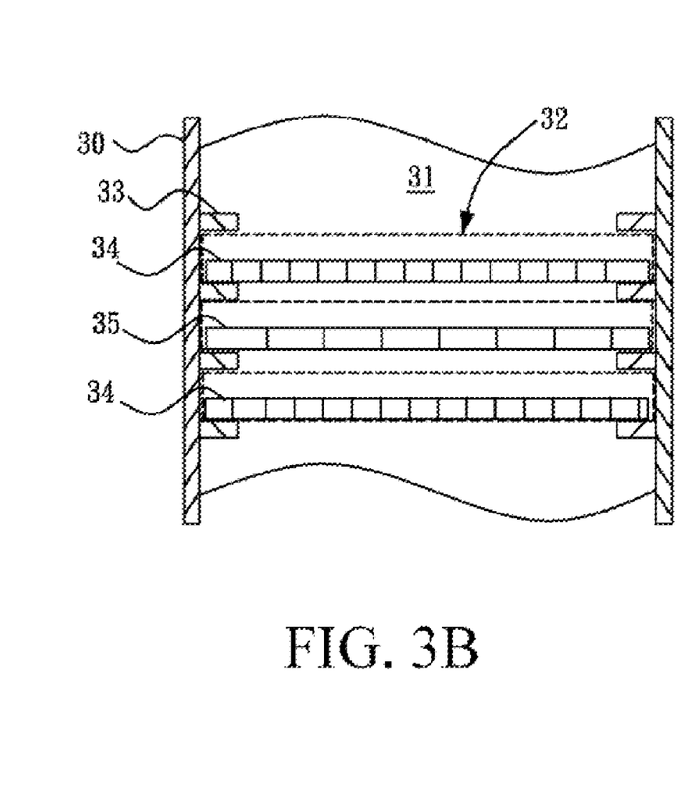
FIG. 3B is a schematic partial view of plates and a slab of radioactive source inserted in the rectangular-parallelepiped container.

The shape of the container of the metal volume source calibration phantom is not limited to the drum-type container, and for an embodiment of the rectangular-parallelepiped metal calibration phantom, reference can be made to FIG. 3B, which is a schematic partial view of plates and a slab of radioactive source inserted in the rectangular-parallelepiped container. The inner space 31 has a plurality of supporting slots 32 of 2 mm high therein, and supporting portions 33 are formed between the supporting slots to support insertion of the metal plates 34 and the slab of radioactive source 35, such that at least one gap exists between the metal plates 34 inside the container, thereby forming a non-uniform calibration phantom. The metal plate 34 may be made of stainless steel or aluminum, but is not limited thereto. The rectangular-parallelepiped container 30 is a rectangular parallelepiped of 350 mm long, 350 mm wide, and 360 mm high, and accordingly, the stainless steel and aluminum are cut into large-area uniform planar metal plates 34 of 350 mm long, 350 mm wide, and 1 mm thick, and then the metal plates 34 are inserted into the supporting slots 32 of the rectangular-parallelepiped container 30 of 350 mm long, 350 mm wide, and 360 mm high. By means of inserting different numbers or kinds of the metal plates 34 by the above method, calibration phantoms with different densities are formed by stainless steel plates, aluminum plates, and stainless steel plates plus aluminum plates. The density of the rectangular-parallelepiped metal volume source calibration phantom ranges from 0.17 $g/cm^3$ to 1.33 $g/cm^3$. The shape of the metal plate may vary with the shape of the container of the calibration phantom, and is not limited to the above shape.

Figure 4A:
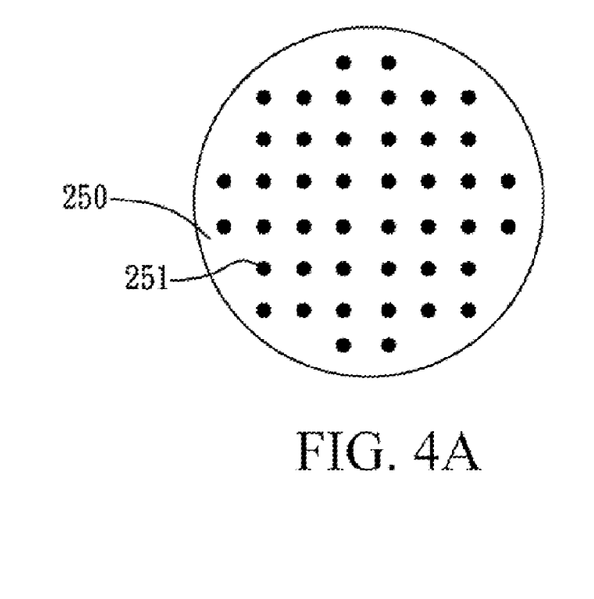
FIG. 4A is a schematic top view of the slab of radioactive source in the drum-type container.
Figure 4B:
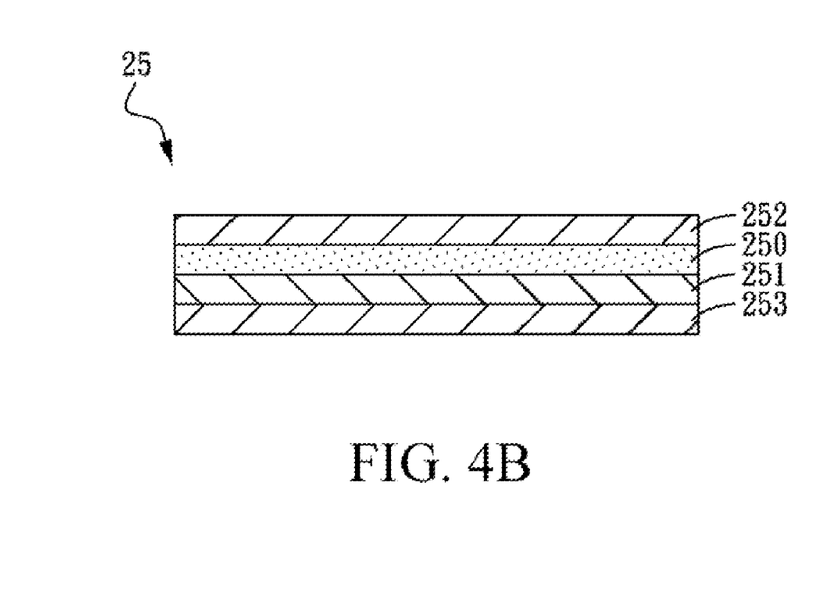
FIG. 4B is a schematic sectional view of the slab of radioactive source.

As for the slab of radioactive source, the slab of radioactive source 25 of the drum-type metal volume source calibration phantom is used as an example for illustration. FIG. 4A is a schematic top view of the slab of radioactive source in the drum-type container. Referring to FIG. 4A, the shape of the slab of radioactive source may vary with the shape of the container of the calibration phantom, and is not limited thereto. FIG. 4B is a schematic sectional view of the slab of radioactive source. A total of 44 drops of 0.2 cc liquid radionuclides 250 are dripped onto a circular-shaped leak-proof filter 251 having a diameter of 53 cm. A top laminating layer 252 and a bottom laminating layer 253 are respectively disposed on top and bottom layers of the leak-proof filter 251, so as to form a circular piece of large-area planar homogeneous slab of radioactive source 25. Every drop of liquid radionuclides expands to a circle having a diameter less than 5 cm. The radionuclide is a γ radioactive source, and the γ radioactive source is selected from a group consisting of $^{137}$cesium ($^{137}$Cs), $^{54}$manganese ($^{54}$Mn), $^{60}$cobalt ($^{60}$Co), and a combination thereof.

Figure 5:
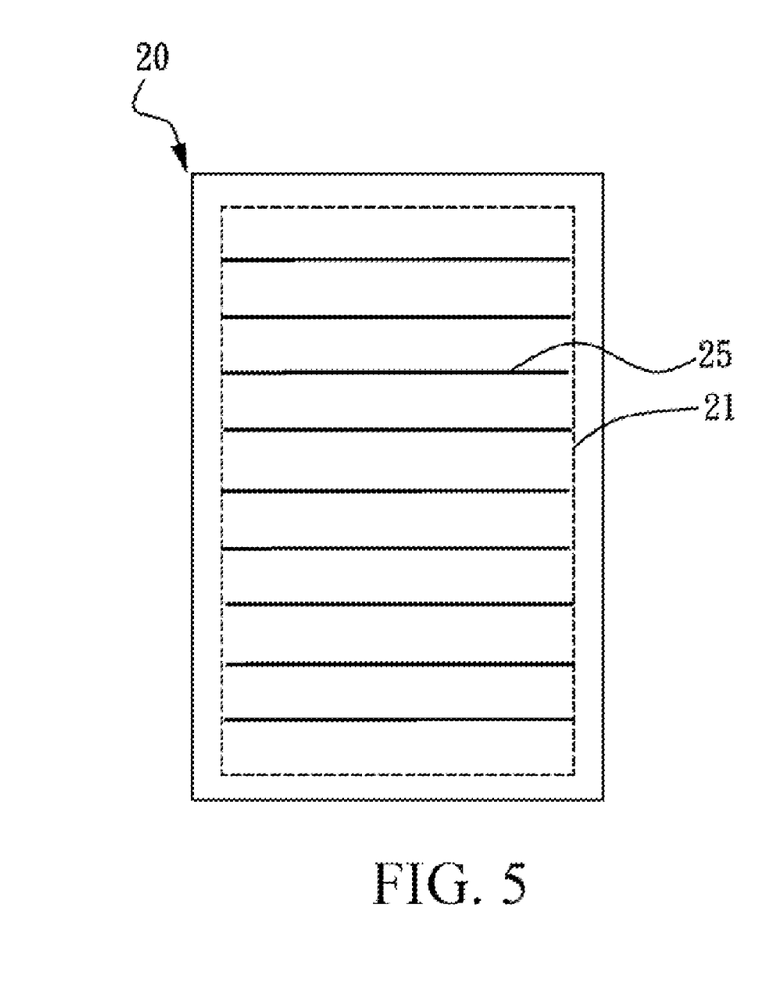
FIG. 5 is a schematic sectional view of nine slabs of radioactive source uniformly inserted in a drum-type metal volume source calibration phantom.

In an embodiment, nine large-area planar slabs of radioactive source 25 of each of nuclides $^{137}$Cs, $^{54}$Mn, and $^{60}$Co, are horizontally placed at an equal distance, approximately 8.7 cm, in the metal volume source calibration phantom 2. At least one metal plate is disposed between the adjacent slabs of radioactive source. The number of the metal plates is dependent on the density to be measured. FIG. 5 is a schematic sectional view of nine slabs of radioactive source 25 uniformly inserted in a drum-type metal volume source calibration phantom. Then, each drum-type metal volume source calibration phantom 2 is placed in the waste curie monitor 1 (as shown in FIG. 1). The nine planar slabs of radioactive source 25 are 8.7 cm away from the ten plastic scintillation detectors at top, bottom, left, right, front, and back sides. By respectively testing three kinds of nuclides $^{137}$Cs, $^{54}$Mn, and $^{60}$Co, three radionuclides with different energies can be obtained, which can form drum-type metal volume source calibration phantoms with different densities in combination with different numbers of stainless steel plates, aluminum plates, and stainless steel plates plus aluminum plates.

Next, the counting efficiency of the metal volume source calibration phantom is evaluated, and the evaluation method and the result are as follows.

Figure 6:
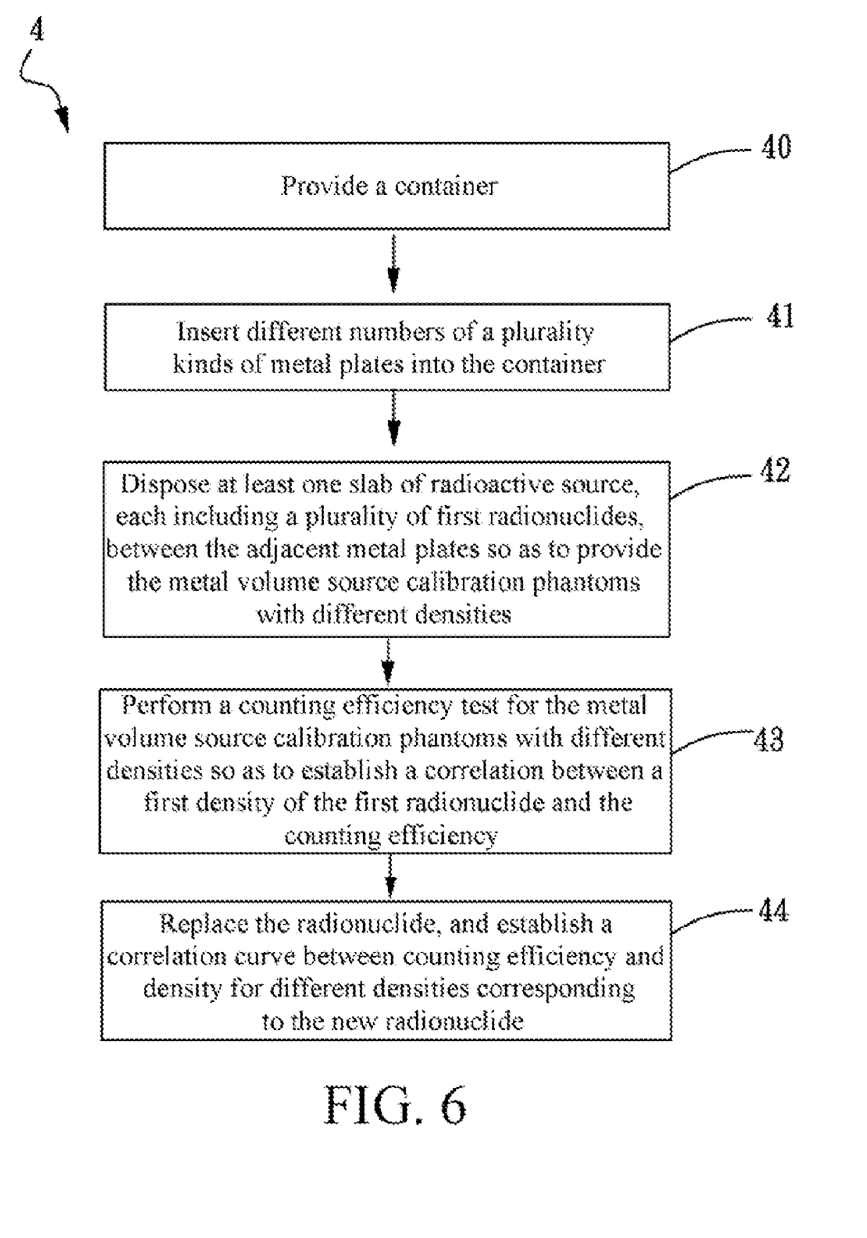
FIG. 6 is a schematic flow chart of a method for calibrating a metal volume source calibration phantom according to the present invention.

FIG. 6 is a schematic flow chart of a method for calibrating a metal volume source calibration phantom according to the present invention. Referring to FIG. 6, the method 4 includes the following steps. Firstly, in Step 40, a container is provided. The features of the container are as described in FIG. 2A and FIG. 2B, so that the details will not be described herein again. Then, in Step 41, different numbers of a plurality kinds of metal plates are inserted into the container. Next, in Step 42, at least one slab of radioactive source, each including a plurality of first radionuclides, is disposed between the adjacent metal plates so as to provide the metal volume source calibration phantoms with different densities. Steps 41 and 42 are mainly to combine different numbers of stainless steel plates, aluminum plates, and stainless steel plates plus aluminum plates with different nuclides $^{54}$Mn, $^{60}$Co, and $^{137}$Cs, so as to form drum-type metal volume source calibration phantoms with different densities and energies.

Figure 7:
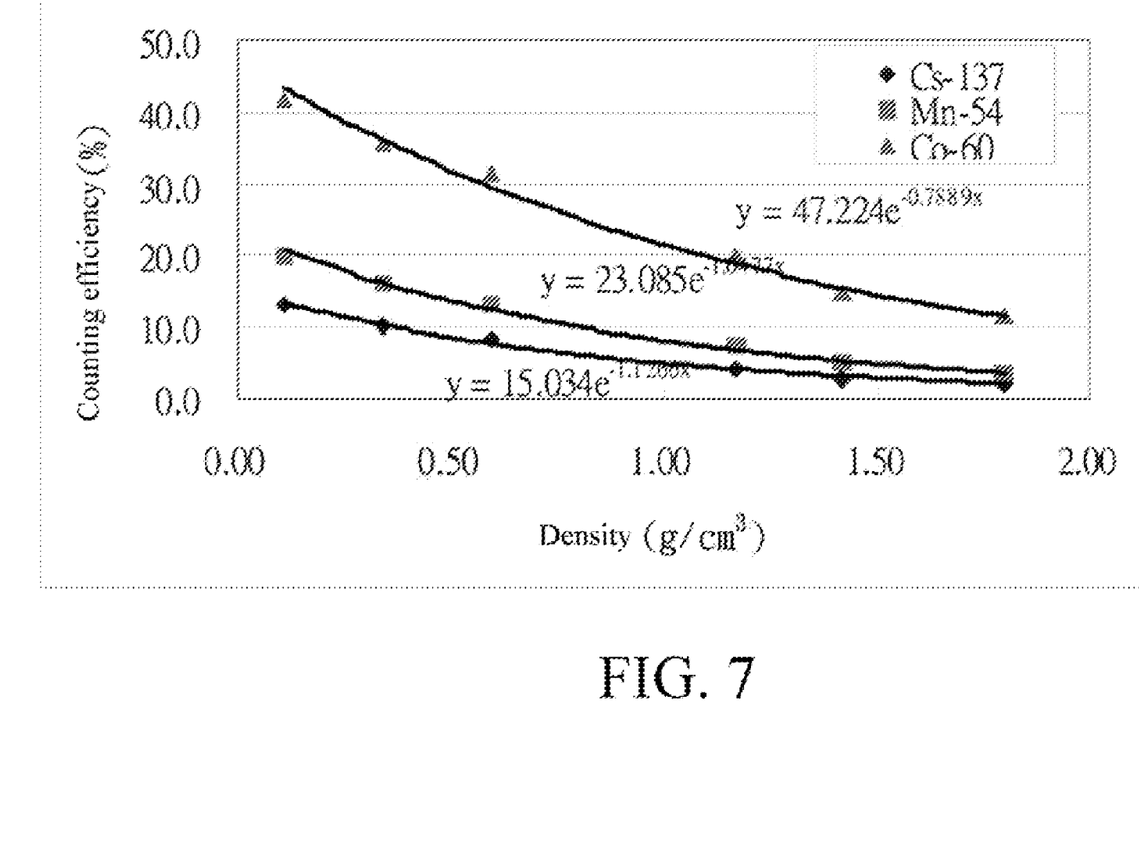
FIG. 7 is a counting efficiency diagram for drum-type metal calibration phantoms with different densities to have large-area sources of Cs, Mn, and Co.

Finally, in Step 43, a counting efficiency test is performed for the metal volume source calibration phantoms with different densities so as to establish a correlation between a first density of the first radionuclide and the counting efficiency. This step is mainly to establish a correlation curve between counting efficiency and density for metal volume source calibration phantoms with different densities relative to one nuclide such as $^{54}$Mn. Then, in Step 44, the radionuclide is replaced, and a correlation curve between counting efficiency and density for different densities corresponding to the new radionuclide is established. Next, different nuclides $^{54}$Mn, $^{60}$Co, and $^{137}$Cs are taken as examples to illustrate Steps 43 to 44 practically, metal volume source calibration phantoms with different densities corresponding to different radionuclides are placed in the waste curie monitor for measurement, and the result of the counting efficiency measurement is as shown in Table 1 and FIG. 7.

Figure 8:
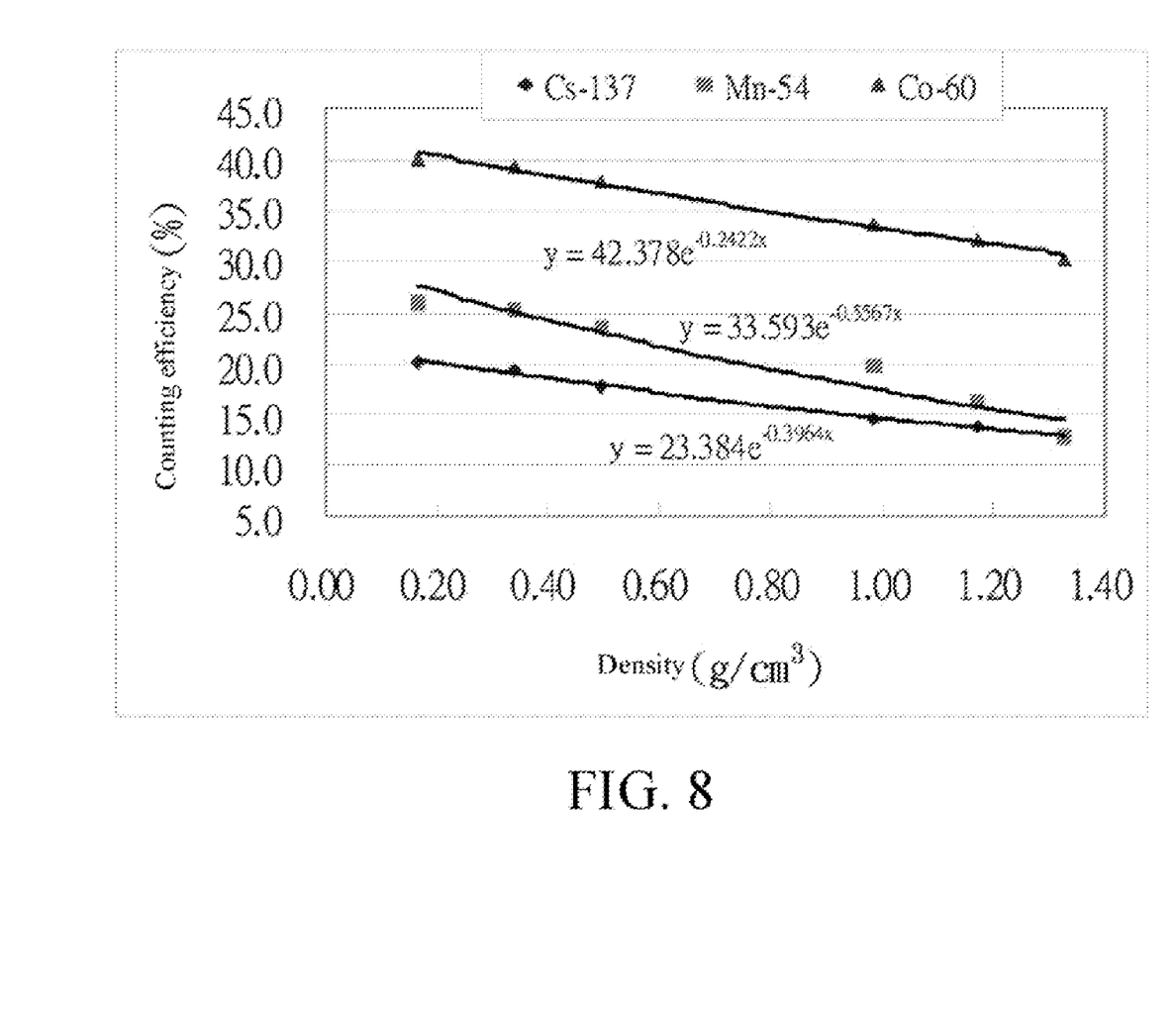
FIG. 8 is a counting efficiency diagram for rectangular-parallelepiped metal calibration phantoms with different densities to have large-area sources of Cs, Mn, and Co.
Figure 9:
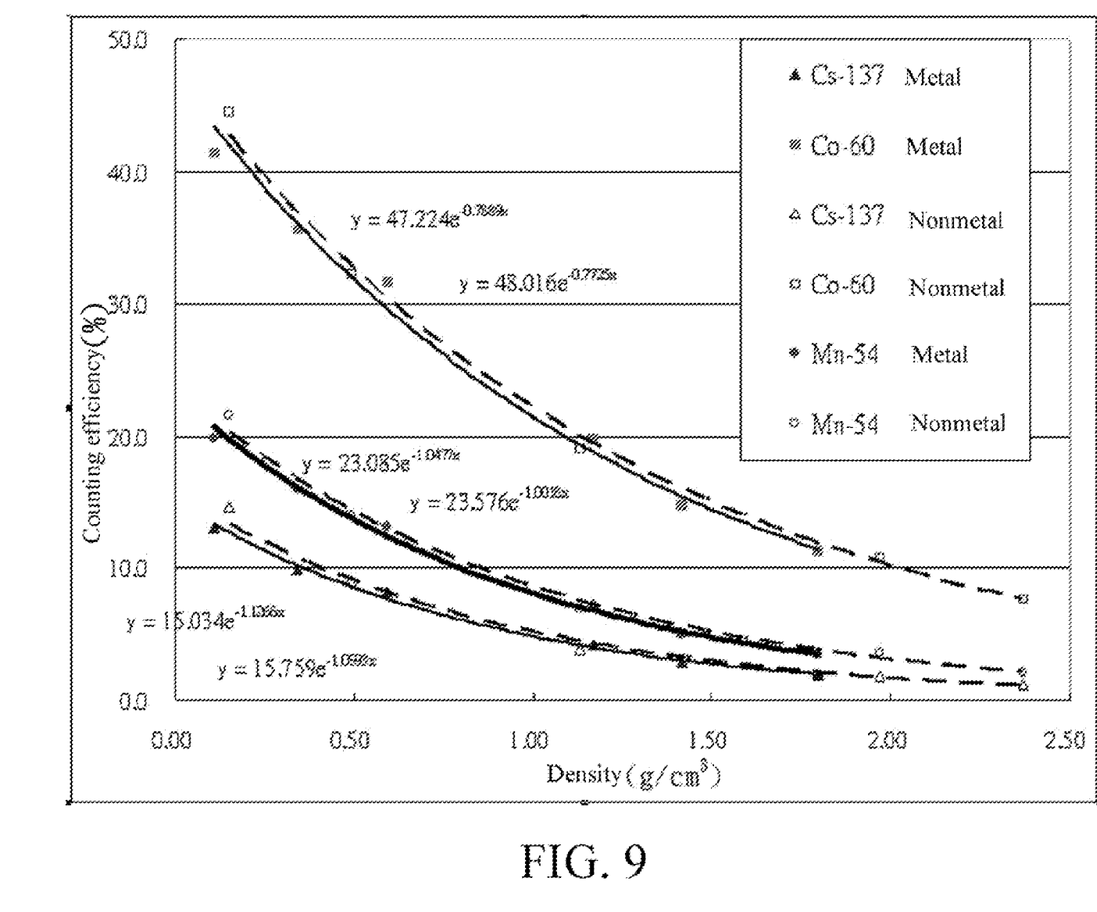
FIG. 9 is a counting efficiency diagram for drum-type metal and nonmetal calibration phantoms with different densities to have large-area sources of Cs, Mn, and Co.
Figure 10:
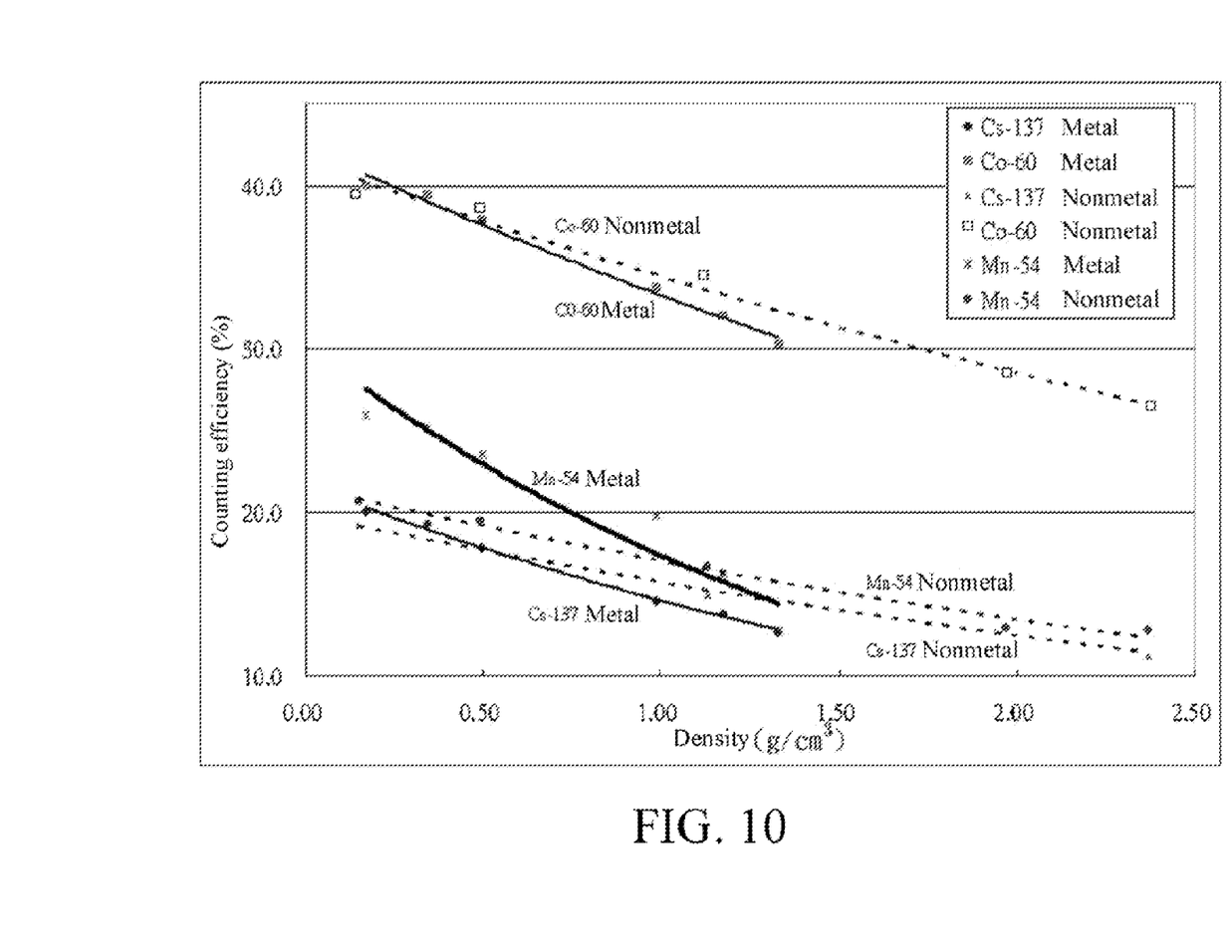
FIG. 10 is a counting efficiency diagram for rectangular-parallelepiped metal and nonmetal calibration phantoms with different densities to have large-area sources of Cs, Mn, and Co.

It can be seen from the test result that for all the three nuclides, counting efficiency is exponentially correlated to density, and decreases as the density increases. The test result of the rectangular-parallelepiped metal volume source calibration phantom is identical to that of the drum-type calibration phantom (as shown in Table 2 and FIG. 8); and given the same density, the higher the energy is, the larger the counting efficiency will be. In addition, it can be found from the results of comparison between the results of the drum-type and box-type metal calibration phantoms and the counting efficiencies of the drum-type and box-type nonmetal calibration phantoms as shown in FIG. 9 and FIG. 10 that, the counting efficiencies of the drum-type metal calibration phantoms having the same density corresponding to Cs-137, Mn-54, and Co-60 are close to those of the drum-type nonmetal calibration phantom; and for the box-type metal calibration phantom corresponding to the radionuclide Mn-54, when the density is smaller than 1 (g/cm$^3$), the counting efficiency thereof is higher than that of the box-type nonmetal calibration phantom. It can be seen from the experimental results that, the counting efficiencies of the metal calibration phantoms are close to those of the nonmetal calibration phantoms, and for the box-type calibration phantoms corresponding to the radionuclide Mn-54, the metal calibration phantom has a higher counting efficiency than the nonmetal calibration phantom.

After the correlation curve between counting efficiency and density is established, the correlation can be used to determine whether the activity of nuclear wastes in an actual nuclear waste container meets the release standards. That is to say, since the nuclear waste container has a fixed volume and can be weighted, the density of the actual nuclear waste container can be obtained. The nuclide in the nuclear wastes can also be known by measurement. Therefore, given that the density and the nuclide are already known, the activity of the nuclear waste container can be obtained by looking up the previously established correlation curve, so as to further determine whether the nuclear wastes stored in the nuclear waste container meet the release standards.

TABLE 1

Metal drum density and nuclide counting efficiency

| Metal material | Net weight kg | Density g/cm3 | Efficiency (%) Cs-137 | Mn-54 | Co-60 |
|---|---|---|---|---|---|
| Aluminum sheet | 21.7 | 0.11 | 13.1 | 19.8 | 41.5 |
| Aluminum sheet | 70.0 | 0.34 | 10.0 | 15.9 | 35.6 |
| Stainless steel sheet | 121.2 | 0.59 | 8.2 | 13.2 | 31.6 |
| Stainless steel sheet | 239.6 | 1.17 | 4.2 | 7.2 | 19.9 |
| Stainless steel sheet + Aluminum sheet | 290.2 | 1.42 | 2.8 | 4.9 | 14.8 |
| Stainless steel sheet + Aluminum sheet | 368.0 | 1.80 | 2.0 | 3.5 | 11.3 |

TABLE 2

Metal box density and nuclide counting efficiency

| Metal material | Net weight kg | Density g/cm3 | Efficiency (%) Cs-137 | Mn-54 | Co-60 |
|---|---|---|---|---|---|
| Aluminum sheet | 6.5 | 0.17 | 20.1 | 25.9 | 39.9 |
| Aluminum sheet | 13.2 | 0.34 | 19.3 | 25.2 | 39.5 |
| Stainless steel sheet | 19.2 | 0.50 | 17.8 | 23.6 | 37.9 |
| Stainless steel sheet | 38.2 | 0.99 | 14.6 | 19.8 | 33.7 |
| Stainless steel sheet + Aluminum sheet | 45.3 | 1.17 | 13.8 | 16.3 | 32.0 |
| Stainless steel sheet + Aluminum sheet | 51.4 | 1.33 | 12.7 | 12.8 | 30.3 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A metal volume source calibration phantom, disposed inside a monitor having a plurality of radioactivity detectors received inside an accommodation space formed inside the monitor, the metal volume source calibration phantom comprising:

a container;

a plurality kinds of metal plates stacked up inside the container; and at least one slab of radioactive source, each disposed between the adjacent metal plates and comprising a plurality of radionuclides, wherein by means of inserting different numbers of the plurality kinds of metal plates inside the container, it is capable of obtaining the metal volume source calibration phantoms with different densities, wherein each of the metal plates is made of stainless steel, aluminum, or a combination thereof;

wherein when the container is a metal box,
- one of the metal plate in the metal box is made of aluminum sheet, the aluminum sheet has a net weight of 13.2 kg, a density of 0.34, and shows a nuclide counting efficiency (%) of 19.3, 25.2 and 39.5 when the radioactive source is Cs-137, Mn-54 and Co-60, respectively;
- one of the metal plate in the metal box is made of stainless steel sheet, the stainless steel sheet has a net weight of 38.2 kg, a density of 0.99, and shows a nuclide counting efficiency (%) of 14.6, 19.8 and 33.7 when the radioactive source is Cs-137, Mn-54 and Co-60, respectively; and
- one of the metal plate in the metal box is made of combination of stainless steel sheet and aluminum sheet, the combination of stainless sheet and aluminum sheet has a net weight of 51.4 kg, a density of 1.33, and shows a nuclide counting efficiency (%) of 12.7, 12.8 and 30.3 when the radio active source is Cs-137, Mn-54, and Co-60, respectively; and wherein when the container is a metal drum,
- one of the metal plate in the metal drum is made of aluminum sheet, the aluminum sheet has a net weight of 70.0 kg, a density of 0.34, and shows a nuclide counting efficiency (%) of 10.0, 15.9 and 35.6 when the radioactive source is Cs-137, Mn-54 and Co-60, respectively;
- one of the metal plate in the metal drum is made of stainless steel sheet, the stainless steel sheet has a net weight of 239.6 kg, a density of 1.17, and shows a nuclide counting efficiency (%) of 4.2, 7.2 and 19.9 when the radioactive source is Cs-137, Mn-54 and Co-60, respectively; and
- one of the metal plate in the metal drum is made of combination of stainless steel sheet and aluminum sheet, the combination of stainless sheet and aluminum sheet has a net weight of 368.0 kg, a density of 1.80, and shows a nuclide counting efficiency (%) of 2.0, 3.5 and 11.3 when the radio active source is Cs-137, Mn-54, and Co-60, respectively.

2. The metal volume source calibration phantom according to claim 1, wherein the radionuclide is a γ radioactive source, and the γ radioactive source is selected from a group consisting of 137cesium (137Cs), 54manganese (54Mn), 60cobalt (60Co) and a combination thereof.

3. The metal volume source calibration phantom according to claim 1, wherein the container is a 55-gallon drum-type or rectangular-parallelepiped container.

4. The metal volume source calibration phantom according to claim 1, wherein a plurality of supporting portions is disposed on inner walls of the container to support the metal plates and the slab of radioactive source, such that at least one gap exists between the metal plates inside the container, thereby forming a non-uniform calibration phantom.

5. A method for calibrating a metal volume source calibration phantom, comprising the following steps:

providing a container; inserting different numbers of a plurality kinds of metal plates into the container; disposing at least one slab of radioactive source, each comprising a plurality of first radionuclides, between the adjacent metal plates so as to provide the metal volume source calibration phantoms with different densities; and performing a counting efficiency test for the metal volume source calibration phantoms with different densities so as to establish a correlation between a first density of the first radionuclide and the counting efficiency, wherein each of the metal plates is made of stainless steel, aluminum, or a combination thereof;

wherein when the container is a metal box,
- one of the metal plate in the metal box is made of aluminum sheet, the aluminum sheet has a net weight of 13.2 kg, a density of 0.34, and shows a nuclide counting efficiency (%) of 19.3, 25.2 and 39.5 when the radioactive source is Cs-137, Mn-54 and Co-60, respectively;
- one of the metal plate in the metal box is made of stainless steel sheet, the stainless steel sheet has a net weight of 38.2 kg, a density of 0.99, and shows a nuclide counting efficiency (%) of 14.6, 19.8 and 33.7 when the radioactive source is Cs-137, Mn-54 and Co-60, respectively; and
- one of the metal plate in the metal box is made of combination of stainless steel sheet and aluminum sheet, the combination of stainless sheet and aluminum sheet has a net weight of 51.4 kg, a density of 1.33, and shows a nuclide counting efficiency (%) of 12.7, 12.8 and 30.3 when the radio active source is Cs-137, Mn-54, and Co-60, respectively; and wherein when the container is a metal drum,
- one of the metal plate in the metal drum is made of aluminum sheet, the aluminum sheet has a net weight of 70.0 kg, a density of 0.34, and shows a nuclide counting efficiency (%) of 10.0, 15.9 and 35.6 when the radioactive source is Cs-137, Mn-54 and Co-60, respectively;
- one of the metal plate in the metal drum is made of stainless steel sheet, the stainless steel sheet has a net weight of 239.6 kg, a density of 1.17, and shows a nuclide counting efficiency (%) of 4.2, 7.2 and 19.9 when the radioactive source is Cs-137, Mn-54 and Co-60, respectively; and
- one of the metal plate in the metal drum is made of combination of stainless steel sheet and aluminum sheet, the combination of stainless sheet and aluminum sheet has a net weight of 368.0 kg, a density of 1.80, and shows a nuclide counting efficiency (%) of 2.0, 3.5 and 11.3 when the radio active source is Cs-137, Mn-54, and Co-60, respectively.

6. The method for calibrating a metal volume source calibration phantom according to claim 5, wherein the first radionuclide is a γ radioactive source, and the γ radioactive source is selected from a group consisting of $^{137}$cesium ($^{137}$Cs), $^{54}$manganese ($^{54}$Mn), $^{60}$cobalt ($^{60}$Co) and a combination thereof.

7. The method for calibrating a metal volume source calibration phantom according to claim 5, wherein the container is a 55-gallon drum-type or rectangular-parallelepiped container.

8. The method for calibrating a metal volume source calibration phantom according to claim 5, further comprising the following steps:
  replacing the first radionuclide with a second radionuclide, and then performing a counting efficiency test for the metal volume source calibration phantoms with different densities so as to establish a correlation between a second density of the second radionuclide and the counting efficiency.

* * * * *